United States Patent
Yeo

(10) Patent No.: US 10,205,367 B2
(45) Date of Patent: *Feb. 12, 2019

(54) MOTOR HAVING A NOISE FILTER

(71) Applicant: LG INNOTEK CO., LTD., Seoul (KR)

(72) Inventor: Jae Young Yeo, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/707,737

(22) Filed: Sep. 18, 2017

(65) Prior Publication Data

US 2018/0006535 A1 Jan. 4, 2018

Related U.S. Application Data

(63) Continuation of application No. 14/567,053, filed on Dec. 11, 2014, now Pat. No. 9,893,599.

(30) Foreign Application Priority Data

Dec. 11, 2013 (KR) .......................... 10-2013-0154013

(51) Int. Cl.
| | |
|---|---|
| *H02K 11/026* | (2016.01) |
| *H02K 11/40* | (2016.01) |
| *H02K 5/14* | (2006.01) |
| *H02K 5/15* | (2006.01) |
| *H02K 11/02* | (2016.01) |
| *H02K 11/22* | (2016.01) |
| *H02K 11/028* | (2016.01) |

(52) U.S. Cl.
CPC ............ *H02K 11/026* (2013.01); *H02K 5/15* (2013.01); *H02K 11/022* (2013.01); *H02K 11/024* (2013.01); *H02K 11/028* (2013.01); *H02K 11/40* (2016.01)

(58) Field of Classification Search
CPC . H02K 5/10; H02K 5/14; H02K 11/02; H02K 11/022; H02K 11/024; H02K 11/026
USPC .......... 310/66, 67 R, 68 R, 71, 72, 177, 229, 310/239, 248, 249
See application file for complete search history.

(56) References Cited

U.S. PATENT DOCUMENTS

| | | | |
|---|---|---|---|
| 4,329,605 A | 5/1982 | Angi et al. | |
| 4,384,223 A * | 5/1983 | Zelt ........................ | H02K 5/225 310/68 R |

(Continued)

FOREIGN PATENT DOCUMENTS

GB    2 151 413    7/1985

OTHER PUBLICATIONS

European Search Report dated Apr. 14, 2015 issued in Application No. 14197315.6.

(Continued)

*Primary Examiner* — John K Kim
*Assistant Examiner* — Minki Chang
(74) *Attorney, Agent, or Firm* — KED & Associates, LLP

(57) ABSTRACT

A motor may include a housing, a motor assembly accommodated in the housing, and a mold cover having an outer circumferential surface. The outer circumferential surface may be coupled to the housing, which has electrical conductivity. A noise filter is provided in the mold cover. A ground terminal of the noise filter is electrically connected to the outer circumferential surface of the mold cover.

12 Claims, 4 Drawing Sheets

(56) References Cited

U.S. PATENT DOCUMENTS

| | | | |
|---|---|---|---|
| 4,853,576 A | 8/1989 | Mayumi et al. | |
| 6,037,693 A | 3/2000 | Marth et al. | |
| 6,858,955 B2 | 2/2005 | Lau | |
| 9,893,599 B2 * | 2/2018 | Yeo | H02K 11/026 |
| 2002/0163263 A1 * | 11/2002 | Uffelman | F04B 17/03 |
| | | | 310/71 |
| 2010/0323552 A1 | 12/2010 | Chaumet et al. | |
| 2012/0038229 A1 | 2/2012 | Watanabe et al. | |
| 2013/0307380 A1 | 11/2013 | Zeng et al. | |
| 2014/0049126 A1 * | 2/2014 | Jiang | H02K 11/026 |
| | | | 310/72 |

OTHER PUBLICATIONS

United States Office Action dated Jun. 19, 2017 issued in U.S. Appl. No. 14/567,053.

* cited by examiner

MOTOR HAVING A NOISE FILTER

CROSS-REFERENCE TO RELATED APPLICATION

This application is a Continuation Application of prior U.S. patent application Ser. No. 14/567,053 filed Dec. 11, 2014, which claims priority under 35 U.S.C. § 119 to Korean Application No. 10-2013-0154013 filed on Dec. 11, 2013, whose entire disclosures are incorporated herein by reference.

BACKGROUND

1. Field

The present application relates to a motor capable of lowering an electromagnetic noise level.

2. Background

In general, a motor may be classified into a brush motor and a brushless motor (BLDC motor). In the above two kinds of motors, the brush motor has been universally and widely utilized and has been employed in various industrial environments due to a relatively inexpensive cost as compared with the brushless motor.

In the direct current brush motor (DC motor) a permanent magnet is employed as a stator, a coil is provided as a rotor, and a repulsive force and an attractive force are generated between the rotor and the stator by converting a flow direction of the current flowing in the rotor so that a rotational force is generated. Most direct current brush motors employ a commutator and a brush for converting the flow direction of the current.

According to a mechanical motion of such a direct current brush motor, however, when a coil is rotated, a polarity of the coil is changed due to a mechanical contact point caused by the brush and the commutator, and a spark is then generated by a counter electromotive force of the coil. Due to the above, a considerably high electromagnetic noise is generated. Such electromagnetic noise influences an operation of the equipment itself in which an electromagnetic wave is generated or other equipment so that this electromagnetic noise causes a functional disorder or malfunction of the equipment.

As one of the methods for removing the electromagnetic noise, a method in which a noise filter is installed to transfer the electromagnetic wave generated between the brush and the commutator of the direct current brush motor to the ground via a housing and to remove it has been employed. However, the above method is disadvantageous in that a contact area between a ground terminal of the noise filter and the housing is small and the noise is not rapidly removed due to this limitation.

BRIEF DESCRIPTION OF THE DRAWINGS

The embodiments will be described in detail with reference to the following drawings in which like reference numerals refer to like elements wherein.

DETAILED DESCRIPTION

Figure 1:
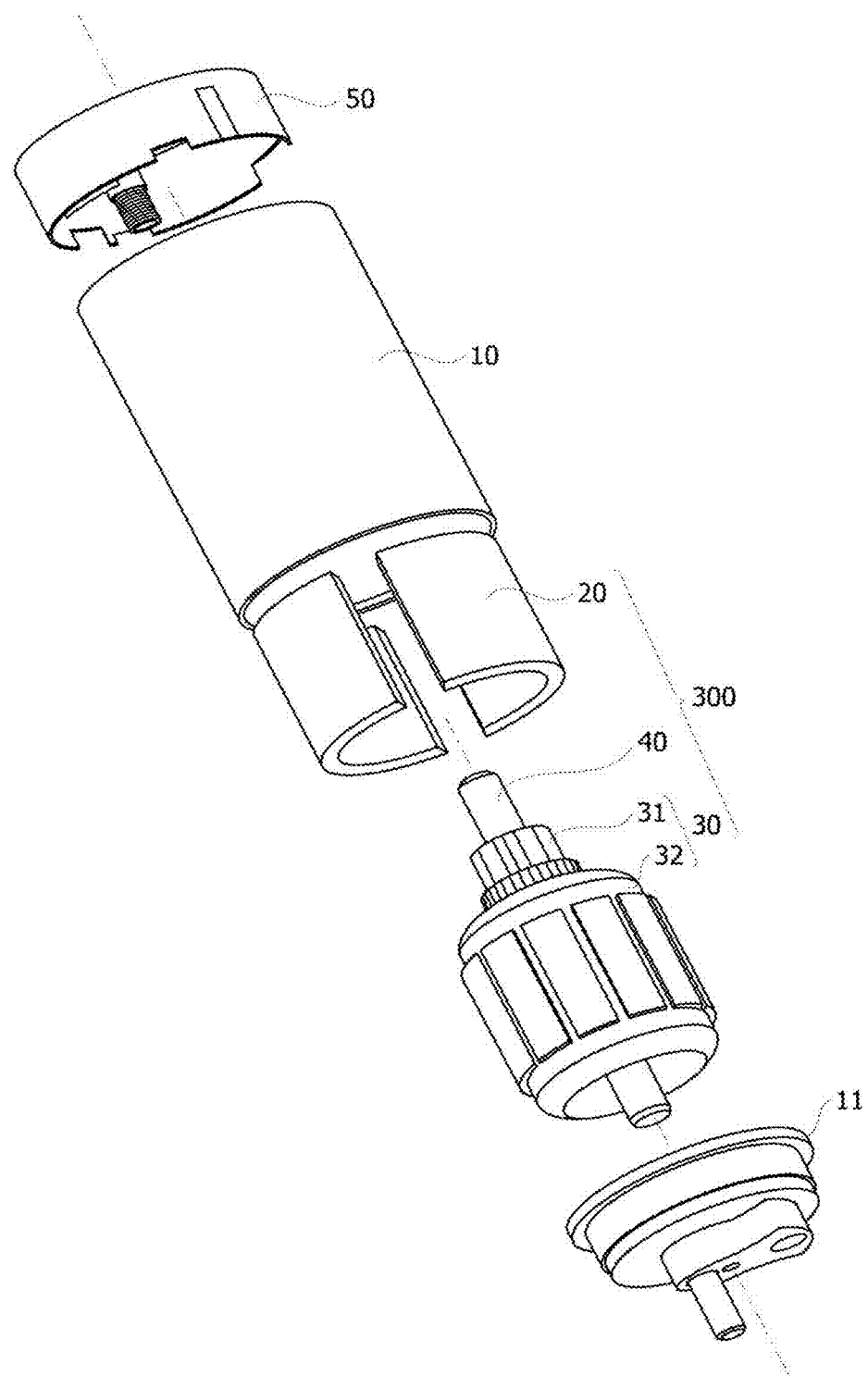
FIG. 1 is an exploded perspective view of a motor according to one embodiment of the present application.

Referring to FIG. 1, a motor includes a housing 10, a motor assembly 300 received in the housing 10, and a mold cover 50 having an outer circumferential surface coupled to the housing 10. The outer circumferential surface of the mold cover has conductivity.

The housing 10 has a cylindrical shape and is provided with a space formed therein so that the motor assembly 300 can be mounted in the space. The shape or material for the housing 10 may be variously changed. A metal material which can withstand a high temperature may be selected for the housing 10.

The mold cover 50 and a lower cover 11 are coupled to the housing 10 to shield a stator 20 and a rotor 30 from the outside. The housing 10 may further include a cooling structure for easily discharging internal heat. An air-cooling type cooling structure or a water-cooling type cooling structure may be selected as a cooling structure, and a shape of the housing 10 may be properly modified depending on the cooling structure.

The motor assembly 300 disposed in the housing 10 includes the stator 20, the rotor 30, and a rotational shaft 40. A plurality of split-ring shaped magnets are arranged on the stator 20, and this stator can be inserted into the internal space of the housing 10. The stator is not limited to the above, and a coil may be wound around a stator core to form the stator.

The rotor 30 includes a rotor core 32 around which a plurality of coils are wound and a commutator 31 mounted to the rotor core 32. The commutator 31 is in contact with a brush mounted to the mold cover 50. One end of the brush is connected to an external power source and the other end is in contact with the commutator 31 to supply the power to the commutator 31. The above structure of the motor may include all the components of a direct current motor provided with the brush.

The mold cover 50 may be manufactured by an injection-molding process with a non-conductive material. A brush connected to the commutator 31 and a noise filter are provided on the mold cover 50. The outer circumferential surface of the mold cover 50 is fitted in the housing 10 so that the mold cover is inserted in the housing.

Figure 2:
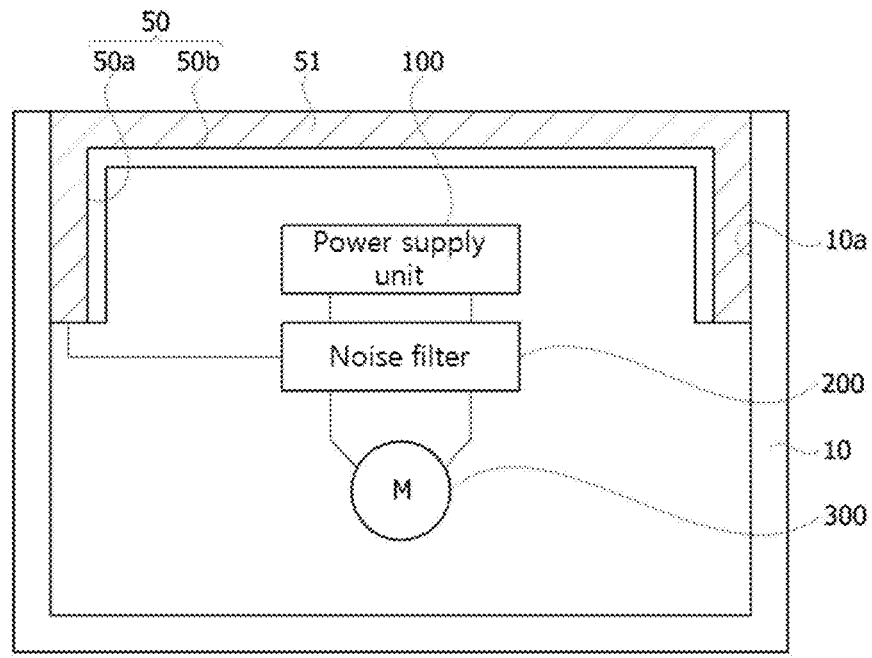
FIG. 2 is a conceptual view of a motor provided with a noise filter according to one embodiment of the present application.

Referring to FIG. 2, a conductive layer 51 is formed on an outer surface of the mold cover 50. The conductive layer 51 is formed on an outer circumferential surface 50a of the mold cover 50 and may be extended to a rear surface 50b. Once the mold cover 50 is inserted in the housing 10, the conductive layer 51 formed on the outer circumferential surface 50a of the mold cover 50 become in contact with an inner circumferential surface 10a of the housing 10 so that the mold cover and the housing are electrically connected to each other.

A well-known structure for supplying direct current power to the motor assembly 300 may be employed as a power supplying part 100. As one example, the power supplying part 100 may be configured of a brush and a commutator connected to an external power source.

A noise filter 200 may be ground-connected to the conductive layer 51. In addition, since the conductive layer 51 is electrically connected to the inner circumferential surface of the housing 10, a contact area is widened. Consequently, by utilizing a large ground-connection, it is possible to rapidly remove noise.

Figure 3:
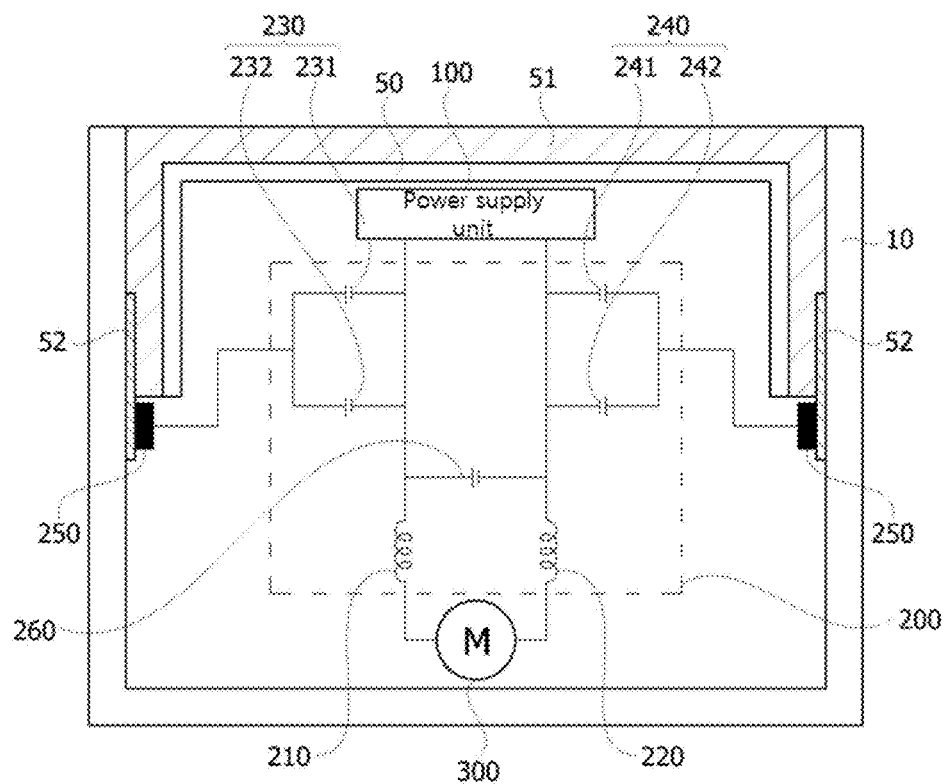
FIG. 3 is a conceptual view concretely showing the noise filter shown FIG. 2.

Referring to FIG. 3, the noise filter 200 includes a first electric storage unit 230, 240, a second electric storage unit 260, a first inductor 210, and a second inductor 220. The first electric storage unit 230, 240 is called as the Y capacitor (Y cap) and can bypass the noise to ground terminals 250.

The first electric storage unit 230, 240 includes a first capacitor module 230 connected to the first inductor 210 and the power supplying part 100 and a second capacitor module 240 connected to the second inductor 220 and the power supplying part 100. The first capacitor module 230 includes a first capacitor 231 and a second capacitor 232, and the second capacitor module 240 includes a third capacitor 241 and a fourth capacitor 242.

For clearly illustrating the structure of the noise filter, FIG. 3 shows that the first capacitor module 230 and the second capacitor module 240 are connected to different ground terminals 250. In practice, however, the first capacitor module 230 and the second capacitor module 240 are connected to one common ground terminal 250.

The second electric storage unit 260 is called as the X capacitor (X cap), and this electrical storage unit can act as a matching capacitor for matching an impedance of a circuit or can perform the function of inhibiting differential mode noise generated by a differential mode current component.

The ground terminal 250 of the noise filter 200 may be directly connected to the conductive layer 51, but may be electrically connected to the conductive layer 51 through a contact pin 52 which is additionally and separately provided. Depending on a thickness of the contact pin 52, a recess in which the contact pin 52 is inserted may be provided on the mold cover 50.

Figure 4:
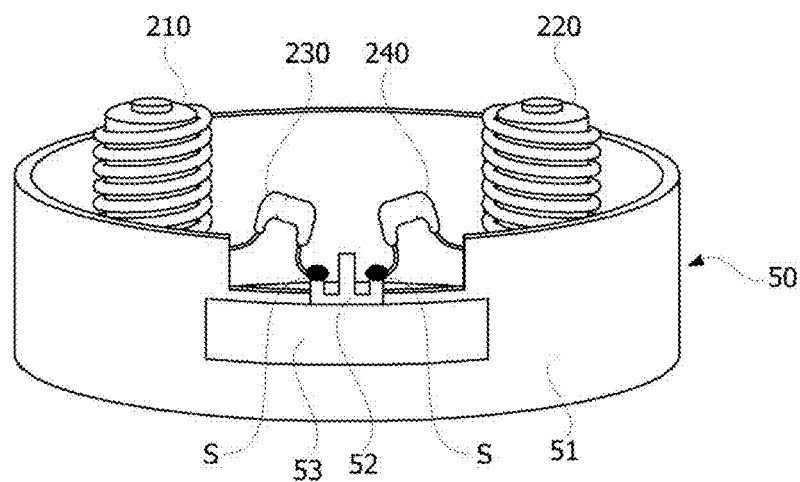
FIG. 4 is a conceptual view showing a state where a ground terminal of a noise filter according to one embodiment of the present application is electrically connected to a mold cover.
Figure 5:
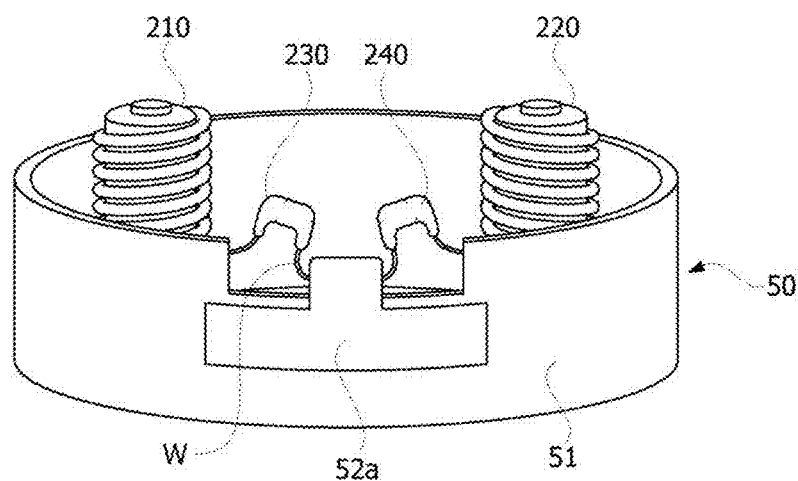
FIG. 5 is a view showing a modified example of the structure shown in FIG. 4.

FIG. 4 illustrates a state where the ground terminal of the noise filter according to one embodiment of the present application is electrically connected to the mold cover, and FIG. 5 is a view showing a modified example of the structure shown in FIG. 4.

Referring to FIG. 4, the first capacitor module 230 and the second capacitor module 240 are electrically connected to the contact pin 52 by soldering portions S, respectively. In addition, the contact pin 52 is electrically connected to the conductive layer 51 through a conductive tape 53. In order to minimize a contact resistance between the conductive tape 53 and the contact pin 52, it is preferable that a size of the conductive tape be larger than an area of the contact pin.

The conductive layer 51 can be formed on a lower surface as well as the outer circumferential surface of the mold cover 50. In a case where the conductive layer 51 is formed on the lower surface of the mold cover 50, the noise generated from the inductors 210 and 220 is directly transferred to the housing 10. In other words, the conductive layer 51 formed on the lower surface of the mold cover 50 can act as the element which bypasses the noise generated from the inductors 210 and 220 to the housing 10.

The conductive layer 51 may be formed of at least one selected from the group consisting of nickel, silver, gold, aluminum, tungsten, and zinc. The conductive layer 51 may be deposited on the overall outer surface of the mold cover 50 by a spray method, but the present application is not limited thereto. The conductive layer may be formed by attaching a conductive film on the overall outer surface of the mold cover.

When considering an assembly tolerance of the housing 10 and the mold cover 50, the conductive tape 53 may have a thickness of 30 to 90 µm and the conductive layer 51 has a thickness of 1 to 10 µm. If the thickness of the conductive layer 51 is less than 1 µm, the conductive layer may not have sufficient conductivity, and if the conductive layer 51 may not a thickness greater than 10 µm, the conductive layer 51 cannot be uniformly formed on the mold cover 50 or may detach from the mold cover.

The sum of thicknesses of the contact pin 52, the conductive layer 51, and the conductive tape 53 should be 100 µm or less. If the sum of thicknesses of the contact pin 52, the conductive layer 51, and the conductive tape 53 exceeds 100 µm, the overall diameter of the mold cover 50 may become excessively large so that a failure of coupling between the mold cover and the housing 10 occurs.

Referring to FIG. 5, if a contact pin 52a has a large area, the conductive tape 53 can be omitted. In other words, all the structures in which the first electric storage unit 230, 240 can be stably connected to the conductive layer 51 can be applied to the present application.

For example, the contact pin 52a is omitted, and a wire W of the first electric storage unit 230, 240 can be directly connected to the conductive layer 51 using the conductive tape. Alternatively, the conductive layer 51 is omitted, and it is possible to electrically connect to the housing with only the contact pin 52 and the conductive tape.

Figure 6:
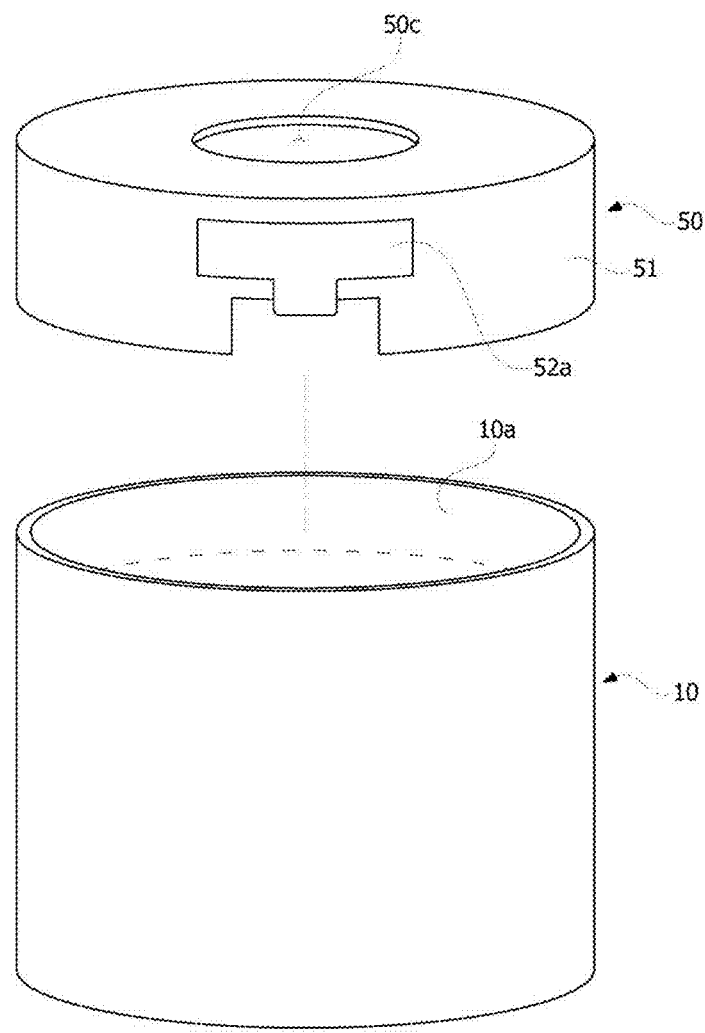
FIG. 6 is a conceptual view showing a state where a mold cover according to one embodiment of the present application is inserted in a housing.
Figure 7:
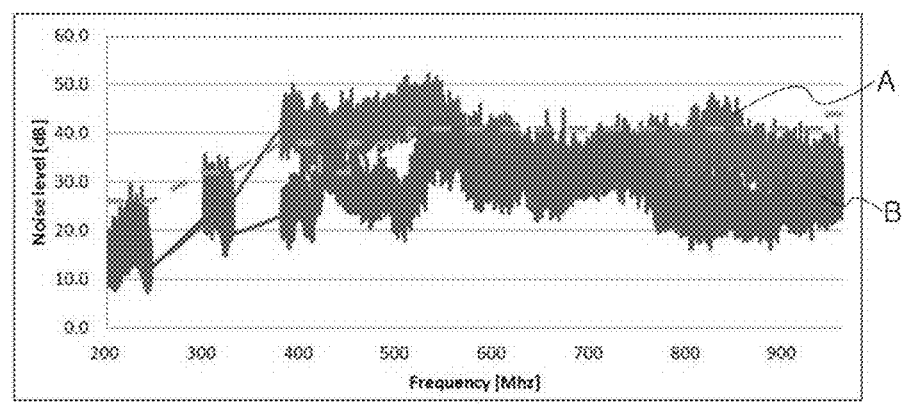
FIG. 7 is a graph illustrating a state where a noise level of a motor according to one embodiment of the present application is reduced.

FIG. 6 illustrates a state where the mold cover according to one embodiment of the present application is inserted in the housing, and FIG. 7 is a graph illustrating a state where a noise level of the motor according to one embodiment of the present application is reduced.

Referring to FIG. 6, the housing 10 includes a ground inner circumferential surface 10a which is electrically connected to the outer circumferential surface of the mold cover 50. In the background structure, since the noise filter is in contact with the housing through the contact pin, a contact area is small. According to the present application, however, since the entire conductive layer 51 formed on the outer circumferential surface of the mold cover 50 is in contact with the ground inner circumferential surface 10a of the housing 10, a contact area can be maximized to effectively lower the noise level.

Therefore, the ground inner circumferential surface 10a may have an area corresponding to an area of the outer circumferential surface of the mold cover 50 inserted in the housing 10. If needed, an additional conductive member may be attached to the ground inner circumferential surface 10a of the housing 10. The reference numeral 50c which is a through hole through which a rotational shaft of the motor passes.

Referring to FIG. 7, it can be known that, as compared with the background structure A, the noise level of the motor B according to the present application is remarkably lowered. From FIG. 7, it can be seen that, as compared with the background structure, the noise level is lowered by 10 dB or more in the frequency range of 200 to 960 MHz which is the most important frequency range of the motor. This is because a contact area is maximized and a contact resistance is reduced to enable the noise to be rapidly removed.

The grounding area of the noise filter is increased so that it is possible to effectively lower the electromagnetic noise level.

It is possible to rapidly bypass the noise generated from the inductor of the noise filter to the housing.

A motor can lower an electromagnetic noise level through a novel structural modification.

A motor according to a preferred embodiment of the present application may include a housing; a motor assembly accommodated in the housing; a mold cover having an outer circumferential surface, the outer circumferential surface being coupled to the housing and having conductivity; and a noise filter accommodated in the mold cover. Here, a ground terminal of the noise filter is electrically connected to the outer circumferential surface of the mold cover.

The mold cover may include a conductive layer formed on the outer circumferential surface thereof, and the ground terminal of the noise filter is electrically connected to the conductive layer. The conductive layer may be extended to a rear surface of the mold cover.

The motor may further include a contact pin disposed between the ground terminal of the noise filter and the conductive layer. The motor may further include a solder portion electrically connecting the ground terminal of the noise filter to the contact pin. The motor may further include a conductive tape by which the contact pin is attached to the conductive layer.

The conductive layer may have a thickness which is less than that of the conductive tape. The sum of thicknesses of the contact pin, the conductive layer, and the conductive tape may be 100 μm or less. The noise filter may include a first electric storage unit connected to the ground terminal. The first electric storage unit may include a first capacitor module connected to a first inductor and a second capacitor module connected to a second inductor.

The motor assembly may include a stator accommodated in the housing; a rotor; a commutator coupled to the rotor; and a rotational shaft which is rotated integrally with the rotor. The housing may include a ground inner circumferential surface which is in contact with the mold cover, and the ground inner circumferential surface has the conductivity. The housing may include a conductive member attached to the ground inner circumferential surface.

A motor according to the present application may include a housing; a motor assembly accommodated in the housing; a mold cover coupled to the housing; and a noise filter accommodated in the mold cover. Here, the housing includes a ground inner circumferential surface which is electrically connected to a ground terminal of the noise filter. An area of the ground inner circumferential surface may correspond to an area of an outer circumferential surface of the mold cover.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor, comprising;
a housing;
a motor assembly disposed in the housing;
a mold cover having an outer circumferential surface coupled to the housing and a rear surface disposed on the outer circumferential surface, wherein the mold cover includes a non-conductive material;
a noise filter disposed in the mold cover and including a ground terminal; and
a conductive layer disposed on the outer circumferential surface of the mold cover and the rear surface of the mold cover, wherein an outer circumference surface of the conductive layer is in contact with an inner surface of the housing; and
a contact pin electrically coupled to the ground terminal, wherein the ground terminal of the noise filter is electrically connected to the outer circumferential surface of the conductive layer,
wherein at least a portion of the contact pin is disposed between an inner surface of the housing and the outer circumferential surface of the conductive layer, the portion of the contact pin is directly contacted to the inner surface of the housing and is directly contacted to the outer circumference surface of the conductive layer.

2. The motor of claim 1, wherein the contact pin is disposed between the ground terminal of the noise filter and the conductive layer.

3. The motor of claim 2, further comprising a solder portion electrically connecting the ground terminal of the noise filter to the contact pin.

4. The motor of claim 2, further comprising a conductive tape by which the contact pin is attached to the outer circumferential surface of the conductive layer.

5. The motor of claim 4, wherein the conductive layer has a thickness which is less than that of the conductive tape.

6. The motor of claim 4, wherein the sum of thicknesses of the contact pin, the conductive layer, and the conductive tape is 100 μm or less.

7. The motor of claim 1, wherein the noise filter comprises a first electric storage unit connected to the ground terminal.

8. The motor of claim 7, wherein the first electric storage unit comprises a first capacitor module connected to a first inductor and a second capacitor module connected to a second inductor.

9. The motor of claim 1, wherein the motor assembly comprises a stator accommodated in the housing; a rotor; a commutator coupled to the rotor; and a rotational shaft which is rotated integrally with the rotor.

10. The motor of claim 1, wherein the housing comprises a ground inner circumferential surface in contact with the conductive layer, and the ground inner circumferential surface has conductivity.

11. The motor of claim 10, wherein the housing comprises a conductive member attached to the ground inner circumferential surface.

12. The motor of claim 1, wherein the conductive layer is formed of one of nickel, silver, gold, aluminum and zinc.

* * * * *